United States Patent
Duby

(10) Patent No.: US 7,403,331 B2
(45) Date of Patent: Jul. 22, 2008

(54) CORRECT IMAGE ZOOMABLE REFLECTING TELESCOPE WITH NEAR STATIONARY EYEPIECE

(76) Inventor: Dante Duby, P.O. Box 1560, El Cajon, CA (US) 92022

( * ) Notice: Subject to any disclaimer, the term of this patent is extended or adjusted under 35 U.S.C. 154(b) by 211 days.

(21) Appl. No.: 11/463,282

(22) Filed: Aug. 8, 2006

(65) Prior Publication Data

US 2008/0037115 A1    Feb. 14, 2008

(51) Int. Cl.
*G02B 23/00* (2006.01)
(52) U.S. Cl. ........................ 359/399; 359/432
(58) Field of Classification Search .................. None
See application file for complete search history.

(56) References Cited

U.S. PATENT DOCUMENTS

| | | | | |
|---|---|---|---|---|
| 4,221,459 A | * | 9/1980 | Fisher | 359/364 |
| 4,444,474 A | * | 4/1984 | Pasko | 359/364 |
| 4,746,798 A | * | 5/1988 | Amon et al. | 250/339.02 |
| 4,881,801 A | * | 11/1989 | Gebelein | 359/364 |
| 5,132,836 A | * | 7/1992 | Fundingsland | 359/364 |

FOREIGN PATENT DOCUMENTS

JP                59005218 A  *  1/1984

* cited by examiner

*Primary Examiner*—Stephone B. Allen
*Assistant Examiner*—Lee Fineman

(57) ABSTRACT

A correct image reflecting telescope with zoom capability comprised of a flat mirror, a parabolic primary mirror, and an image correcting system. The flat mirror reflects the incoming light from the telescope aperture into the parabolic primary mirror. The reflected light from the primary mirror passes back through a small centrally located opening in the flat aperture mirror and into an image correcting lens system. The image correcting system repositions the focal point of the primary mirror from a point in front of the flat aperture mirror to a point behind this mirror for observation with an eyepiece. The image correcting system makes the telescope useful in terrestrial as well as celestial applications and it can be moved with respect to the primary mirror such that a zoom feature results. This intrinsic zoom of the telescope allows an observer to use a single eyepiece in place of many, eliminates the need for an additional finder scope, and also makes the telescope useful in spotting scope applications. The eyepiece can remain at a stationary level for all observable directions.

3 Claims, 4 Drawing Sheets

CORRECT IMAGE ZOOMABLE REFLECTING TELESCOPE WITH NEAR STATIONARY EYEPIECE

BACKGROUND OF THE INVENTION

The present invention relates to telescopes, more specifically to an improved version of reflective telescope whereby the image is corrected intrinsic to the telescope optics. This feature combined with a nearly stationary eyepiece and zoom capability make it particularly useful for terrestrial as well as celestial use.

This invention uses a specially designed telescope mount of my co-pending application. This mount has multiple degrees of freedom to accommodate the additional range of motion requirements and can easily be used in either a horizontal or vertical manner depending on individual comfort preferences and telescope size.

One object of the invention is to improve the optical performance of a reflecting telescope over that of the Newtonian, Cassegrain, Gregorian, Maksutov and Schmidt-Cassegrain types. This optical advantage results from blocking less of the incoming light then these other telescope types. These other telescopes in general block more light as telescope aperture increases, whereas the amount of light blocked by a telescope of the present invention remains constant, independent of telescope size. Furthermore, the blockage of light that does occur is far less then that of even the smallest of the other telescope types.

Another object of the invention is to enhance the usefulness of a reflecting telescope design by incorporating image correcting optics into the design. This allows the telescope to be used for terrestrial as well as celestial observation at a reduced cost. The advantage of this is most apparent when compared to the Newtonian type of telescope which generally cannot be used for terrestrial observation even with external correctors. This is because the image it creates is rotated at some angle dependent on the eyepiece location in addition to being inverted. The other types of reflecting telescopes can have their images corrected, but they require additional external optical components to do it.

Another object of the invention is to enhance the usefulness of a reflecting telescope design by maintaining the eyepiece at a comfortable viewing level. The advantage of this is readily apparent when compared to a large Newtonian telescope of equal size since the Newtonian eyepiece height is directly related to its aperture size. An observer using a large Newtonian design would require a ladder to reach the eyepiece while an observer using the present invention could sit in a chair while observing the same images. Similarly, the advantage is apparent when compared to most other types of telescopes which typically require viewing angle attachments to view objects overhead whereas the present invention does not.

Another object of the invention is to enhance the usefulness of a reflecting telescope by incorporating a zoom feature into the design. This zoom feature utilizes the same optical components as the image corrector thus combining features without increasing cost. Therefore fewer external optical components are required to achieve equal magnification performance. Additionally this feature can eliminate the need for an external finder scope since a reduction in magnification can also be achieved.

Another object of the invention is to achieve a lower cost compared to most other telescope designs. This advantage can be achieved by first using elementary optics rather than custom components, or components requiring specially shaped optical pairs to eliminate aberrations. And second, by reducing the precision requirements of its secondary mirror compared to the other telescopes mentioned. And third, by eliminating the need for as many external optical components as possible; This includes components such as finder scopes, viewing angle attachments, zoom attachments, image correctors, image reducers, and multiple eyepieces all of which the other telescope types use at substantial additional cost.

Another object of the invention is to create a reflecting telescope design that is rugged enough to remain collimated after being set at a factory. The advantage of this is most apparent when compared to the Newtonian design which generally requires collimation with each use, particularly when transported, to maintain optimum performance. The very stable design structure of the present invention makes it useful as a spotting type field telescope which generally cannot be done effectively using a reflective type telescope.

These and other objects and advantages of the present invention will become increasingly apparent upon consideration of the drawings and ensuing description.

PRIOR ART

The prior art, in all cases where a reflected cone of light from a concave mirror passes through an aperture in a flat mirror, has the focal point of the light cone pass through the aperture in the flat mirror to a point behind the minor. That approach inherently necessitates that the aperture in the flat mirror be larger to allow for focus travel with an eyepiece. That approach also causes the size of the aperture in the flat mirror to vary dependent on the F number of the concave mirror, with lower F numbers requiring larger openings. Both of those disadvantages cause more of the incoming light to be blocked and cause minor aperture variability from telescope to telescope. The present invention uses an image correcting lens arrangement to reposition the focal point of the concave minor from a point in front of the aperture in the flat mirror to a point behind the mirror. This approach allows the size of the aperture in the flat mirror to remain the same for all telescopes of this type, independent of size or F number. This also makes it easy to reposition the focal point to a comfortable location for viewing with an eyepiece and allows for common elements to be used for all telescope sizes. Also inherent in this image correcting system is the ability to provide a zoom feature without adding additional components which none of these related telescopes can do.

The most closely related prior art patents to the present invention are: U.S. Pat. No. 5,132,836 issued to Fundingsland, U.S. Pat. No. 4,444,474 issued to Pasko, and U.S. Pat. No. 4,221,459 issued to Fisher.

Further consideration of these also shows in the case of the Fundingsland design an external finder scope is not practical so a second concave minor is used between its main concave mirror and its flat aperture mirror for this purpose. This mirror is then folded down after use. The addition of the second concave mirror makes the design more complex and increases cost. In addition, the Fudingsland telescope, by virtue of design, is a completely open optical system which permits stray light to affect optical performance. And, it would require a separate image correcting element for terrestrial use. The present invention can be completely sealed, when using an optical window in the telescope aperture, no finder scope would be needed, and the image correcting optics are intrinsic to the design.

In the case of the Pasko design, an external finder scope mounts to an upper turret. And, since this upper turret can rotate and be tilted in nearly any direction, so too would the finder scope, making it difficult to use if pointing straight up or backwards. The rotating turret design adds to the complexity of the telescope in addition to requiring a third mirror, both of which add to the cost. Furthermore, the Pasko design requires and external image corrector for terrestrial use. Since the present invention uses an optical zoom feature within its image correction system, which can reduce magnification as well as increase it, neither an external finder scope nor external image corrector are needed and therefore costs are further reduced accordingly.

Although the Fisher design can use an external finder scope, it requires viewing angle attachments to view images at high angles of elevation. Since the present invention can maintain the eyepiece at a constant level independent of the viewing direction, no such angle attachments would be require. Also, in the Fisher design, light passes through an objective lens before striking the flat mirror and concave mirror, requiring those mirrors to be more precise and therefore more expensive.

SUMMARY OF THE INVENTION

The present invention is a reflecting telescope which yields a correct upright image, has zoom capability intrinsic to the design, and can maintain the eyepiece at a constant comfortable position independent of the image viewing angles.

It is comprised of a flat mirror, a parabolic primary mirror, and an image correcting system. The flat mirror reflects the incoming light from the telescope aperture into the parabolic primary mirror. The reflected light from the primary mirror passes hack through a small centrally located opening in the flat aperture mirror and into an image correcting lens system. The image correcting system repositions the focal point of the primary mirror from a point in front of the flat aperture mirror to a point behind this mirror for observation with an eyepiece.

DETAILED DESRIPTION OF THE PREFERRED EMBODIMENT

Figure 1:
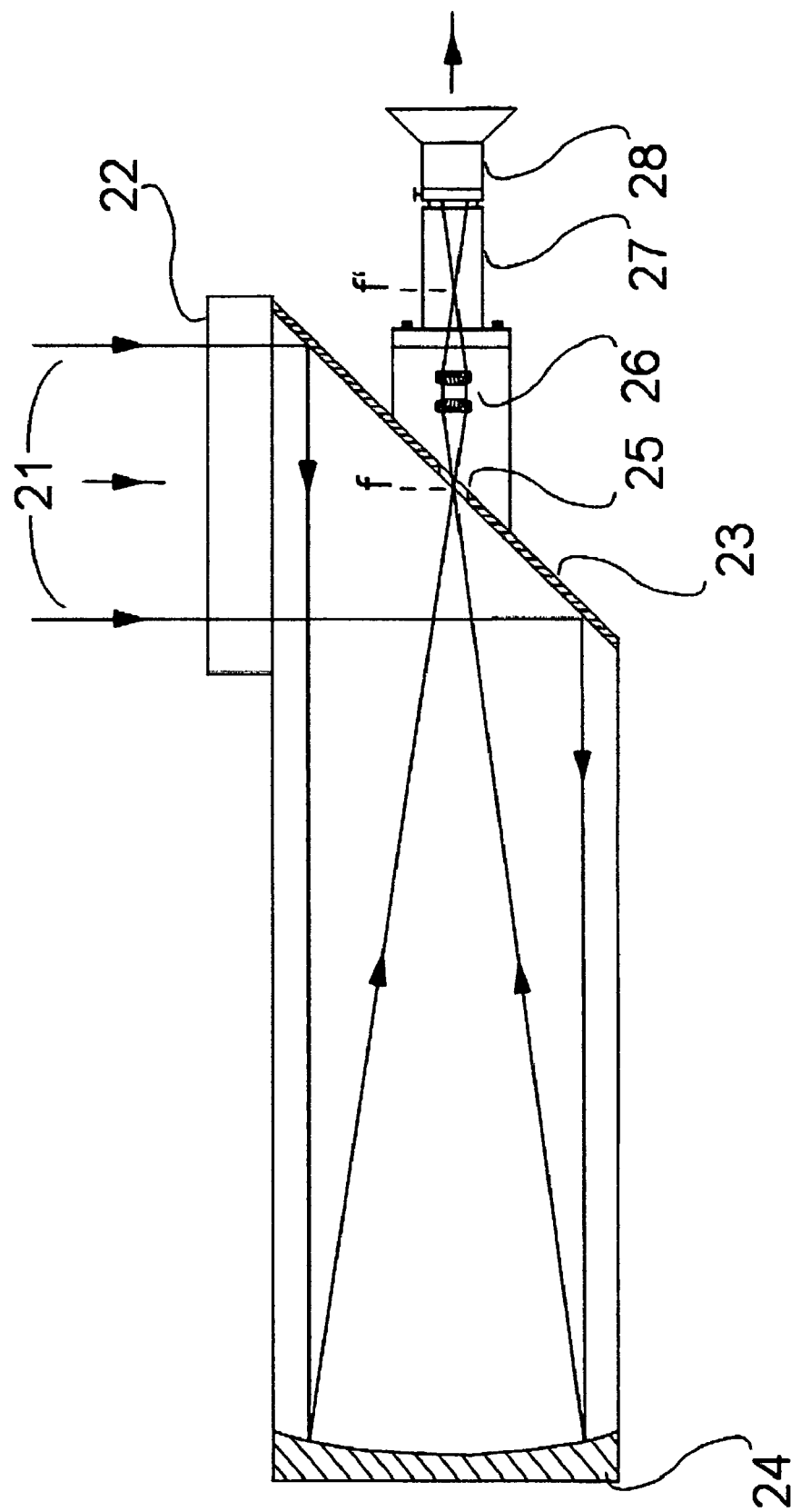
FIG. 1 shows a sectional view of the telescope with the light paths indicated by arrows.

Referring to the drawings for a more detailed explanation of the preferred form of the invention, FIG. 1 shows the basic concept of the invention. Light 21 entering the aperture of the telescope 22 reflects off the flat aperture mirror 23 which redirects the light into the parabolic primary mirror 24. The light reflects off the primary mirror 24 and back through a small centrally located opening 25 in the flat aperture mirror 23. The focal point of this light f is just in front of the flat aperture mirror 23. The light then passes through the flat aperture mirror 23 and into the image correcting lens system 26. The focal point of the image correcting lens system 26 is coincident to the focal point of the primary mirror 24, in front of the opening 25 in the flat aperture mirror 23 at f, for the zero magnification zoom condition shown. The image correcting lens system 26 repositions the focal point to f within the focuser range 27. The eyepiece 28 is then moved back and forth as necessary to achieve focus of the image being viewed. The parallel light rays are shown exiting the eyepiece.

Figure 2:
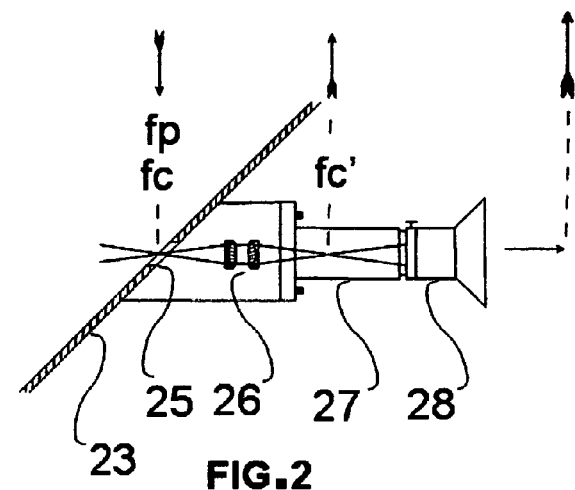
FIG. 2 shows a sectional view of image correcting lenses at zero magnification zoom.

FIG. 2 shows the image correcting lens system in the zero magnification zoom condition. The focal points of the primary mirror fp and the image correcting lens system fc are coincident in front of the opening 25 in the flat aperture mirror 23. Although a simple pair of achromatic lenses is shown as the image corrector 26, other optical arrangements can be used. The inverted image presented by the primary mirror, indicated by an inverted arrow at fp, is corrected at the output of the image corrector 26, indicated by an upright arrow of the same size at fc', and is repositioned within the focuser range 27. The resulting image from the eyepiece 28 is then indicated by a larger upright arrow at the eyepiece output.

Figure 3:
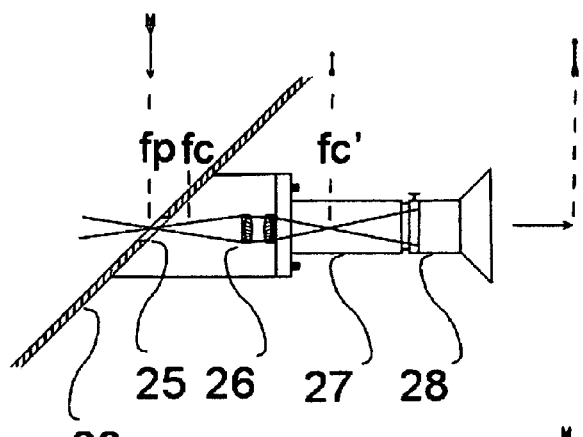
FIG. 3 shows a sectional view of image correcting lenses at negative magnification zoom.

FIG. 3 shows the image correcting lens system in the negative magnification zoom condition. The focal points of the primary mirror fp and the image correcting lens system fc are not coincident in front of the opening 25 in the flat aperture mirror 23, but are in fact separated. When this occurs, the inverted image presented by the primary mirror, indicated by an inverted arrow at fp, is not only corrected by the image corrector 26, but is also reduced, indicated by an upright arrow of lesser size at fc', and repositioned within the focuser range 27. The resulting image from the eyepiece 28 is then indicated by a larger upright arrow at the eyepiece output.

Figure 4:
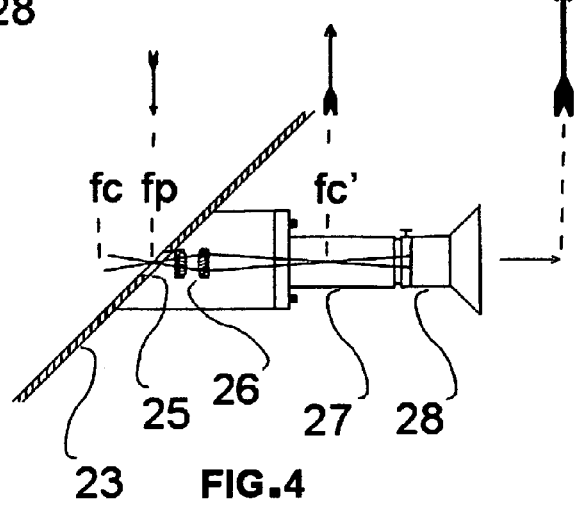
FIG. 4 shows a sectional view of image correcting lenses at positive magnification zoom.

FIG. 4 shows the image correcting lens system in the positive magnification zoom condition. The focal points of the primary mirror fp and the image correcting lens system fc are not coincident in front of the opening 25 in the flat aperture mirror 23, but do in fact overlap. When this occurs, the inverted image presented by the primary mirror, indicated by an inverted arrow at fp, is not only corrected by the image corrector 26 but also enlarged, indicated by an upright arrow of greater size at fc', and repositioned within the focuser range 27. The resulting image from the eyepiece 28 is then indicated by a larger upright arrow at the eyepiece output.

Figure 5:
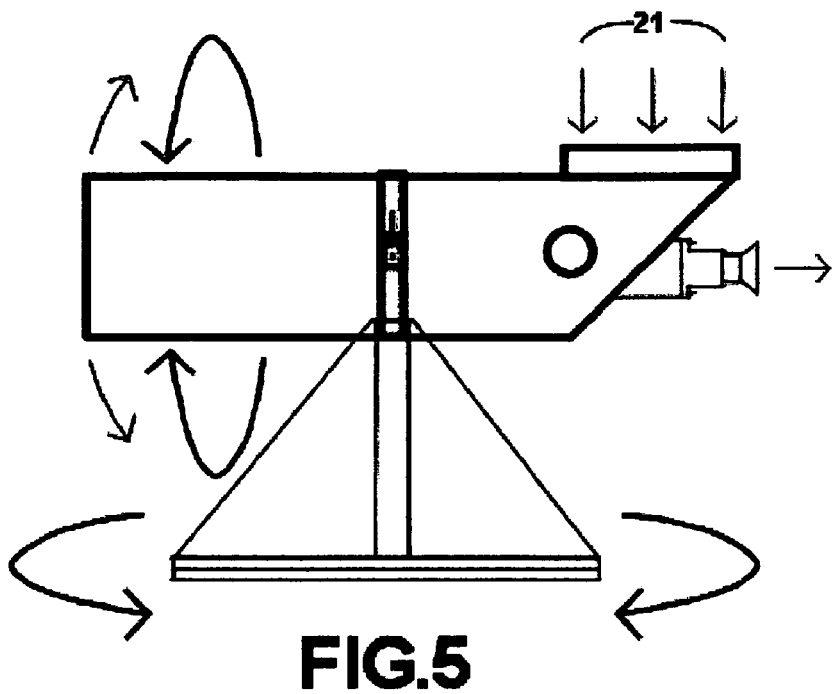
FIG. 5 shows the telescope in a horizontal telescope mount and pointing straight up.
Figure 6:
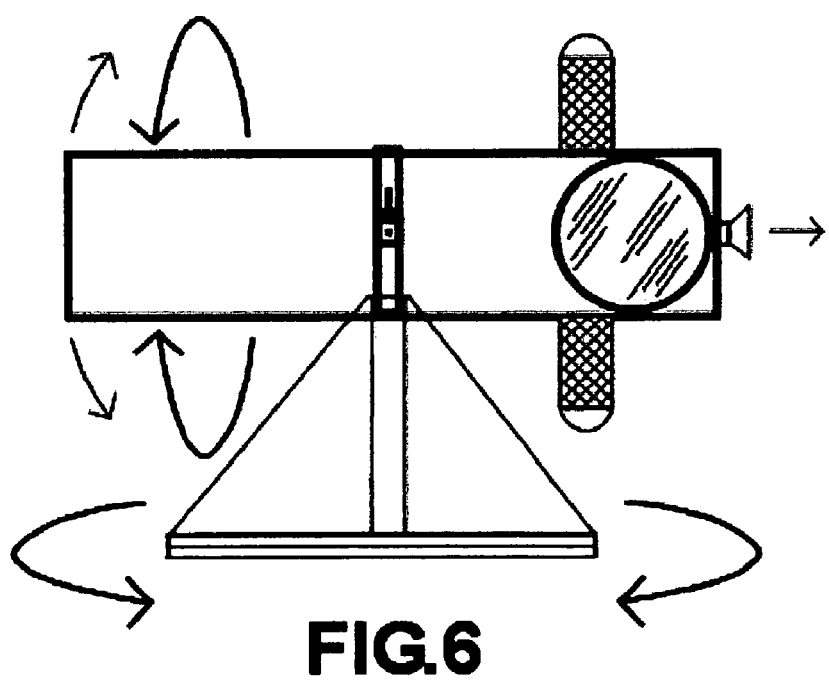
FIG. 6 shows the telescope in a horizontal telescope mount and pointing out the page.

FIG. 5 and FIG. 6 show the telescope used in a horizontal position in a special telescope mount, reference co-pending patent application. A telescope of the present invention cannot use any of the existing standard telescope mounts because it requires additional ranges of motion. This type of mount has multiple degrees of freedom to accommodate the required ranges of motion and can be used in either the horizontal or vertical positions without readjustment. All areas of the sky or landscape can be viewed in this horizontal position with the eyepiece remaining comfortably at the same level. FIG. 5 shows the telescope pointed directly overhead with light 21 entering the telescope aperture from above and exiting the eyepiece to the right. The curved arrows near the telescope illustrate the telescopes ability to rotate about its base, its tube, or rock up and down while in a mound of this type. FIG. 6 shows the telescope pointed out of the page, or to the side in the real world, for terrestrial observation. Light enters through the telescope aperture and exits from the eyepiece to the right. These figures show the telescopes ability to observe 180° of sky, using this type of mount, without moving the eyepiece. This orientation is best suited for celestial observation with larger telescopes because the eyepiece location is the same independent of the aperture size or overhead viewing angle. Contrast that to the Newtonian type telescopes, where the eyepiece location varies directly with aperture size and most other telescopes where the eyepiece location changes with overhead viewing angle. This near stationary eyepiece offers a great advantage in safety over the Newtonian type design since the user can remain on the ground rather than on a ladder as would be the case with a large Newtonian.

Figure 8:
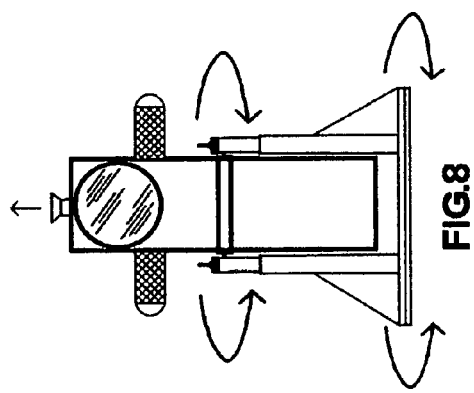
FIG. 8 shows the telescope in a vertical telescope mount and pointing out the page.
Figure 7:
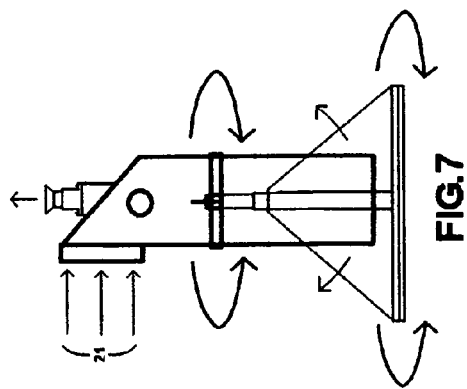
FIG. 7 shows the telescope in a vertical telescope mount and pointing to the left.

FIG. 7 and FIG. 8 show the telescope used in the vertical position in the same telescope mount described above. FIG. 7 shows the telescope pointed to the side for terrestrial observation with light 21 entering the telescope aperture from the left and exiting from the eyepiece above. FIG. 8 is similar, with the telescope pointed out of the page with curved arrows indicating the mounts rotational ability. This orientation is better suited for terrestrial observation, smaller telescope sizes, and applications where space is limited.

Figure 9:
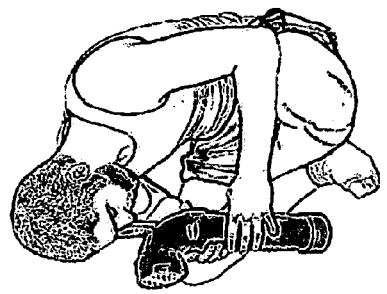
FIG. 9 shows the telescope in a vertical body/ground mount, isometric view.

FIG. 9 shows a telescope of the same vertical configuration using a body/ground mount instead of the telescope mount. This is generally not done with most telescope types which require a legged mount for stability reasons. However, the physical nature of this telescope configuration makes this type of mount quite stable and easy to use. This body/ground mount orientation is primarily for terrestrial use as in a spotting scope application.

Figure 10:
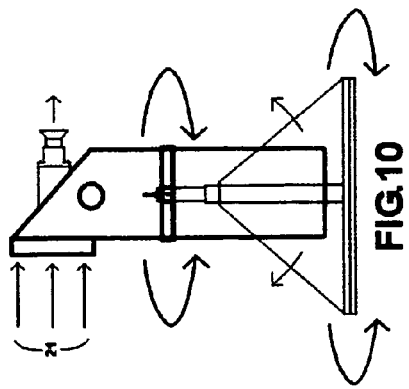
FIG. 10 shows the telescope in a vertical mount with alternative eyepiece location.

FIG. 10 also shows the telescope used in the vertical position with the same telescope mount described above, bus except with the eyepiece pointed parallel to the aperture instead of perpendicular to it. This alternative eyepiece configuration is primarily for terrestrial use. Light 21 is shown entering the telescope aperture from the left and exiting the eyepiece to the right. This eyepiece configuration and telescope orientation is ideal for standing use, terrestrial observation, and applications where space is limited.

Figure 12:
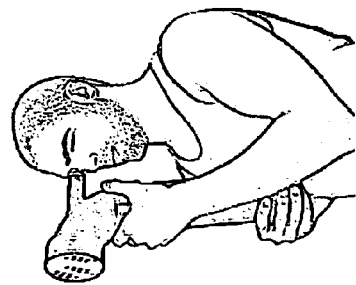
FIG. 12 shows the telescope in a vertical body mount, isometric view, spotting scope.
Figure 11:
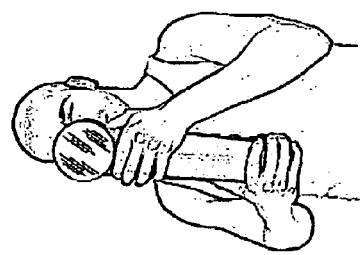
FIG. 11 shows the telescope in a vertical body mount, front view, spotting scope.

FIG. 11 and FIG. 12 show this same telescope configuration as FIG. 10 but using an A-typical body mount in a spotting scope application. Generally, a telescope of the size shown cannot be hand held due to the amount of hand shake which occurs and makes observation all but impossible. Furthermore, there is usually no way to effectively use the standing body as a telescope mount because current telescope designs preclude it by nature. However, the uniqueness of this telescope design allows a user to anchor the scope to the upper body as shown which stabilizes the shake such that normal viewing is possible. No other telescope type allows the body to be used in this way.

Operation of the telescope is fairly straightforward and is essentially the same for each eyepiece configuration and telescope orientation. Considering a horizontal mount orientation, the user could sit in a chair with the eyepiece at a comfortable viewing level. This is true independent of telescope aperture size for all practical applications up to about eight feet in diameter. Since the intrinsic zoom capabilities of the telescope allow for a reduction in image size as well as magnification, no finder scope would be required. Therefore, the user would first reduce the magnification of the telescope by adjusting the image zoom corrector in order to locate the object they wish to observe. Then once the object is centered, the user would focus the image with a focuser which moves the eyepiece in relation to the image corrector. Then the user could zoom in to whatever magnification is desired and then readjust the focus if necessary.

With this orientation, for viewing different overhead angles in celestial use, the telescope would simply be rotated within its mount about the telescope tube. An electrical motor or similar means could also rotate the telescope in this way. The eyepiece would remain in the exact same location through 180° of revolution. For viewing different landscape directions, the telescope would be rotated in the base of the mount.

Considering a vertical mount orientation, the user could be standing or sitting dependent on the eyepiece configuration with viewing adjustments identical to that described above. The only differences would be in the directional changes of view. For viewing different overhead angles in celestial use the telescope would be tilted back in its mount. For viewing different landscape directions, the telescope would simply be rotated within its mount about the telescope tube or mount base. It may be apparent that any telescope which is small enough to be used in a vertical orientation can also be used in the horizontal orientation just by tilting it back to a horizontal position and using as previously described.

Considering a standing body-mount spotting scope application, the user would adjust for viewing as previously described and rotate the upper body for directional adjustment. One advantage of using the telescope in this type of spotting scope application is the ability to observe over small obstacles such as brush without requiring an elevated location with an un-obstructed view, as is more typical with other spotting scopes. Of course this telescope could also be used in the same manner as other spotting scopes if desired.

Some general considerations for a telescope of this type: First, all viewing angles or positions of the telescope yield an upright correct image. Second, an optical window could be fitted in the telescope aperture to seal the telescope optics for use as a spotting scope or in a binocular type configuration. This could also be done in the larger configurations to help keep the optics clean. Third, it is anticipated that the ruggedness of the design will make it unnecessary to re-collimate the optics after being set at the factor making it a reasonable choice for a spotting scope or other mobile application. Fourth, the image corrector could be modular or use modular elements.

I claim:

1. A telescope comprising:
   (a) a flat mirror with a small central aperture,
   (b) a concave mirror the focal point of which nearly coincides with said flat mirror central aperture on a common axis and facing said flat mirror on the front/reflective side with said flat mirror at an angle such that images reflected by said flat mirror shall strike said concave mirrors reflective surface,
   (c) a lens means located on the back side of said flat mirror with its front focal point on a common axis with said concave mirror and said flat mirror aperture,
   (d) with said lens means back focal point on a common axis with a viewing lens system,
   (e) where said lens means inverts and repositions said concave mirror focal image to a position behind said flat mirror at said lens means back focal point,
   (f) where movement of said lens means with respect to said concave mirror increases or decreases image size observed with said viewing lens system.

2. The combination of claim 1 and further including said concave mirror be of parabolic shape.

3. A telescope comprising:
   (a) a flat mirror with a small central aperture which passes through said flat mirror at an angle which intersects said flat mirror's optical axis,
   (b) a concave mirror the focal point of which nearly coincides with said flat mirror central aperture such that the concave mirror's optical axis intersects said flat mirror's optical axis at the same angle as said flat minor central aperture so that said concave mirror's optical axis passes through the center of said flat mirror central aperture,
   (c) with said concave mirror facing said flat mirror on the front/reflective side such that images reflected by said flat mirror shall strike said concave mirror's reflective surface, converge in front of said flat mirror, and pass through said flat mirror central aperture,
   (d) a lens means located on the back side of said flat mirror with its front focal point on a common optical axis as said concave mirror and said flat mirror aperture,
   (e) with said lens means back focal point on a common optical axis as a viewing lens system,
   (f) where said lens means inverts and repositions said concave mirror focal image to a position behind said flat mirror at said lens means back focal point,
   (g) where movement of said lens means with respect to said concave mirror increases or decreases image size observed with said viewing lens system.

* * * * *